(12) United States Patent
Malone

(10) Patent No.: US 10,783,127 B2
(45) Date of Patent: Sep. 22, 2020

(54) COMPONENTIZED DATA STORAGE

(71) Applicant: Disney Enterprises, Inc., Burbank, CA (US)

(72) Inventor: James A. Malone, Burbank, CA (US)

(73) Assignee: Disney Enterprises Inc., Burbank, CA (US)

( * ) Notice: Subject to any disclaimer, the term of this patent is extended or adjusted under 35 U.S.C. 154(b) by 317 days.

(21) Appl. No.: 14/919,551

(22) Filed: Oct. 21, 2015

(65) Prior Publication Data

US 2016/0371284 A1 Dec. 22, 2016

Related U.S. Application Data

(60) Provisional application No. 62/181,139, filed on Jun. 17, 2015.

(51) Int. Cl.
*G06F 16/22* (2019.01)

(52) U.S. Cl.
CPC .................... *G06F 16/22* (2019.01)

(58) Field of Classification Search
CPC combination set(s) only.
See application file for complete search history.

(56) References Cited

U.S. PATENT DOCUMENTS

| | | | |
|---|---|---|---|
| 5,109,439 A | 4/1992 | Froessl | |
| 5,729,741 A | 3/1998 | Liaguno | |
| 5,864,870 A | 1/1999 | Guck | |
| 6,282,549 B1 | 8/2001 | Hoffert | |
| 6,880,122 B1 | 4/2005 | Lee | |
| 7,933,870 B1 * | 4/2011 | Webster | G06F 16/178 707/638 |
| 8,301,998 B2 | 10/2012 | Ruvini | |
| 8,326,820 B2 | 12/2012 | Li | |
| 8,620,849 B2 | 12/2013 | Moitra | |
| 8,898,150 B1 * | 11/2014 | Kuramochi | G06F 16/58 707/722 |
| 9,946,698 B2 * | 4/2018 | Guarnieri | G06F 40/171 |

(Continued)

OTHER PUBLICATIONS

Barreto et al. "Efficient File Storage Using Content-based Indexing" SOSP 2005, pp. 1 of 1.

(Continued)

*Primary Examiner* — Etienne P Leroux
(74) *Attorney, Agent, or Firm* — Farjami & Farjami LLP

(57) ABSTRACT

There are provided computer systems and methods for performing componentized data storage. Such a system includes a hardware processor, a system memory, and a data componentization unit including a data resolution module and a data archiving module stored in the system memory. The hardware processor is configured to execute the data componentization unit to receive a data file including multiple data types, and to transform the data file into data components corresponding respectively to the multiple data types. The hardware processor is further configured to execute the data componentization unit to generate database entries each including one of the data components, and to store each of the database entries in one of multiple databases based on the data type corresponding to the data component included in the database entry.

20 Claims, 5 Drawing Sheets

(56) References Cited

U.S. PATENT DOCUMENTS

| | | | |
|---|---|---|---|
| 2002/0080142 A1* | 6/2002 | Takase | G06K 17/00 345/530 |
| 2002/0095410 A1* | 7/2002 | Takahashi | G06F 17/3061 |
| 2003/0055871 A1* | 3/2003 | Roses | G06F 17/3089 709/203 |
| 2004/0093331 A1* | 5/2004 | Garner | G06N 5/022 |
| 2004/0210608 A1* | 10/2004 | Lee | G06F 11/1451 |
| 2005/0060741 A1* | 3/2005 | Tsutsui | H04N 5/445 725/32 |
| 2006/0036646 A1* | 2/2006 | Mao | G06F 16/58 |
| 2007/0044013 A1* | 2/2007 | Hyatt | H04M 1/72522 715/239 |
| 2008/0168135 A1 | 7/2008 | Redlich | |
| 2009/0012984 A1 | 1/2009 | Ravid | |
| 2010/0161616 A1* | 6/2010 | Mitchell | G06F 16/22 707/741 |
| 2011/0075950 A1* | 3/2011 | Ohashi | G06F 17/30259 382/305 |
| 2011/0296321 A1* | 12/2011 | Lord | G06Q 10/00 715/760 |
| 2012/0124081 A1* | 5/2012 | Ebrahimi | G06F 16/214 707/769 |
| 2013/0030829 A1* | 1/2013 | Tchoudovski | G16H 10/60 705/2 |
| 2013/0174017 A1* | 7/2013 | Richardson | G06F 40/10 715/234 |
| 2014/0075393 A1* | 3/2014 | Mei | G06F 17/30967 715/863 |
| 2014/0279716 A1 | 9/2014 | Cormack | |
| 2015/0262007 A1* | 9/2015 | Sesum | G06K 9/00469 382/177 |

OTHER PUBLICATIONS

Grimes "Code Name WinFS: Revolutionary File Storage System Lets Users Search and Manage Files Based on Content" Dec. 27, 2003, pp. 1-7.

"Camilistore" http://camlistore.org/ FOSDEM 2014, pp. 1-2.

* cited by examiner

COMPONENTIZED DATA STORAGE

RELATED APPLICATION(S)

The present application claims the benefit of and priority to a Provisional Patent Application Ser. No. 62/181,139, filed Jun. 17, 2015, and titled "Componentized Data Storage," which is hereby incorporated fully by reference into the present application.

BACKGROUND

Data files often have several different types of data stored within them, such as text, metadata, and images, for example. However, storing different data types together in the same data file can make later retrieval of the data challenging. For instance, search algorithms developed to look for text may not effectively identify data stored in tables or as text accompanying images. As a result, the conventional approach to storing data can be inefficient for large-scale content searching, post-processing, and indexing.

SUMMARY

There are provided systems and methods for performing componentized data storage, substantially as shown in and/or described in connection with at least one of the figures, and as set forth more completely in the claims.

DETAILED DESCRIPTION

Figure 1:
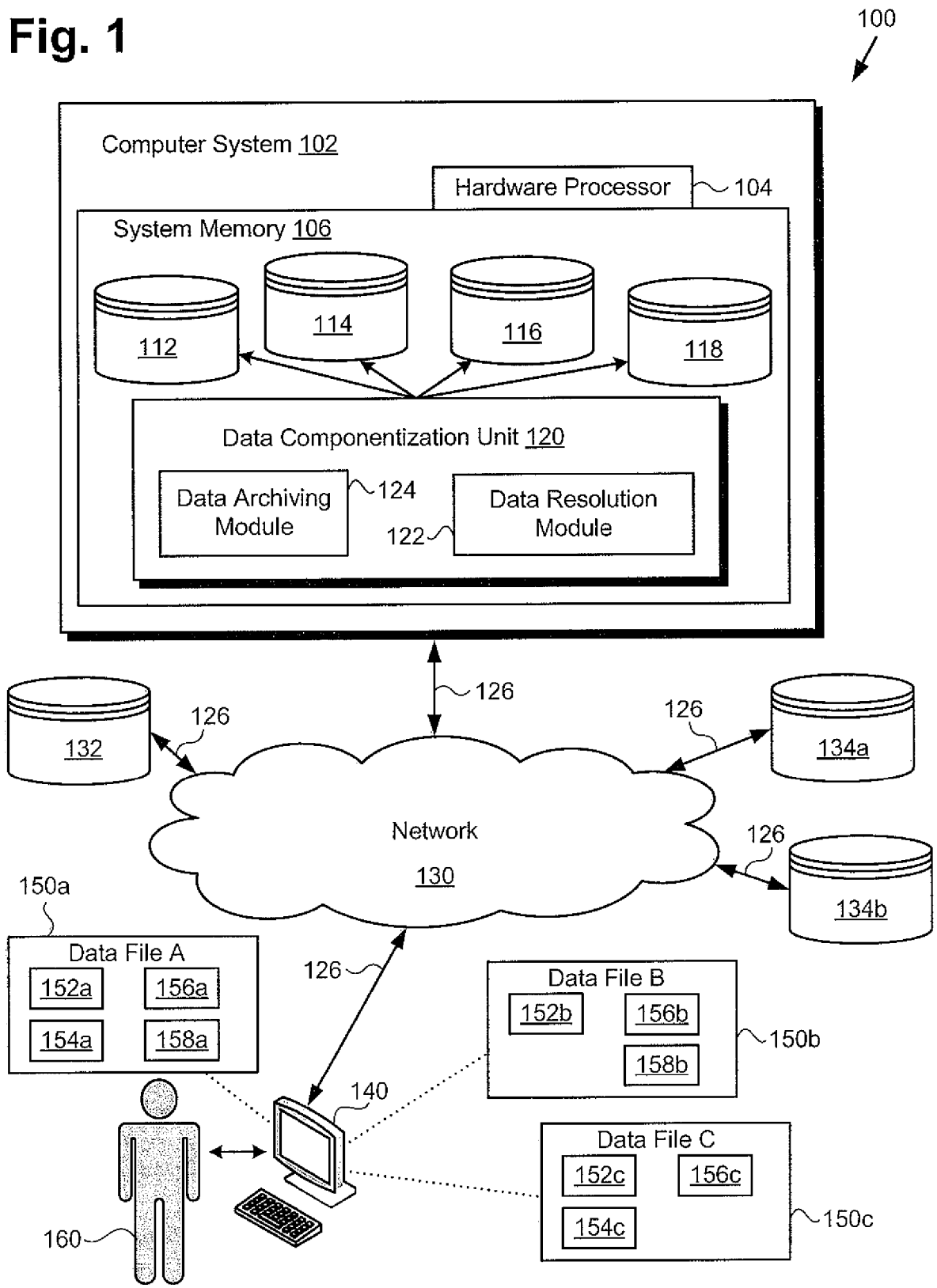
FIG. 1 shows a diagram of one exemplary implementation of a computer system for performing componentized data storage.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes systems and methods for performing componentized data storage. The systems and methods disclosed herein may receive a data file including multiple data types, and may parse that data file to identify the different types of data it contains. According to implementations of the present inventive concepts, the data file including multiple data types is then transformed into data components corresponding respectively to the multiple data types. Those data components, in turn, are used to generate database entries that are saved in databases segregated by data type, where the database entries can be searched, accessed, and modified. Consequently, the componentized data storage solution disclosed in the present application can increase the efficiency and effectiveness with which large-scale content searching, post-processing, and indexing of data is performed.

Referring to FIG. 1, FIG. 1 shows a diagram of one exemplary implementation of a computer system for performing componentized data storage. As shown in FIG. 1, computer system 102 is utilized in computing environment 100, and includes hardware processor 104, and system memory 106 having data componentization unit 120 and databases 112, 114, 116, and 118 stored therein. In addition, data componentization unit 120 is shown to include data resolution module 122 and data archiving module 124.

As further shown in FIG. 1, communication environment 100 also includes communication network 130 interactively linking computer system 102 with backup databases 132, 134a, and 134b, as well as client system 140, via network communication links 126. Also shown in FIG. 1 are data files 150a, 150b, and 150c residing on client system 140, and user 160 of client system 140. Each of data files 150a, 150b, and 150c, is shown to include multiple data types. For example, data file 150a includes data types 152a, 154a, 156a, and 158a, which may correspond respectively to text, images, tables, and metadata, for example. Moreover, data file 150b includes data types 152b, 156b, and 158b, which may analogously correspond respectively to text, tables, and metadata, while data file 150c includes data types 152c, 154c, and 156c, which may analogously correspond respectively to text, images, and tables.

It is noted that although FIG. 1 depicts data componentization unit 120 and databases 112, 114, 116, and 118 as being mutually co-located in system memory 106, that representation is merely provided as an aid to conceptual clarity. More generally, computer system 102 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within computer system 102. Thus, it is to be understood that data componentization unit 120 and one or more of databases 112, 114, 116, and 118 may be stored remotely from one another within the distributed memory resources of computer system 102.

According to the implementation shown by FIG. 1, system user 160 may utilize client system 140 to interact with computer system 102 over communication network 130. In one such implementation, computer system 102 may correspond to one or more web servers, accessible over a packet network such as the Internet, for example. Alternatively, computer system 102 may correspond to one or more computer servers supporting a local area network (LAN), or included in another type of limited distribution network. Although client system 140 is shown as a personal computer (PC) in FIG. 1, that representation is also provided merely as an example. In other implementations, client system 140 may be any other suitable mobile or stationary computing device or system.

Figure 2:
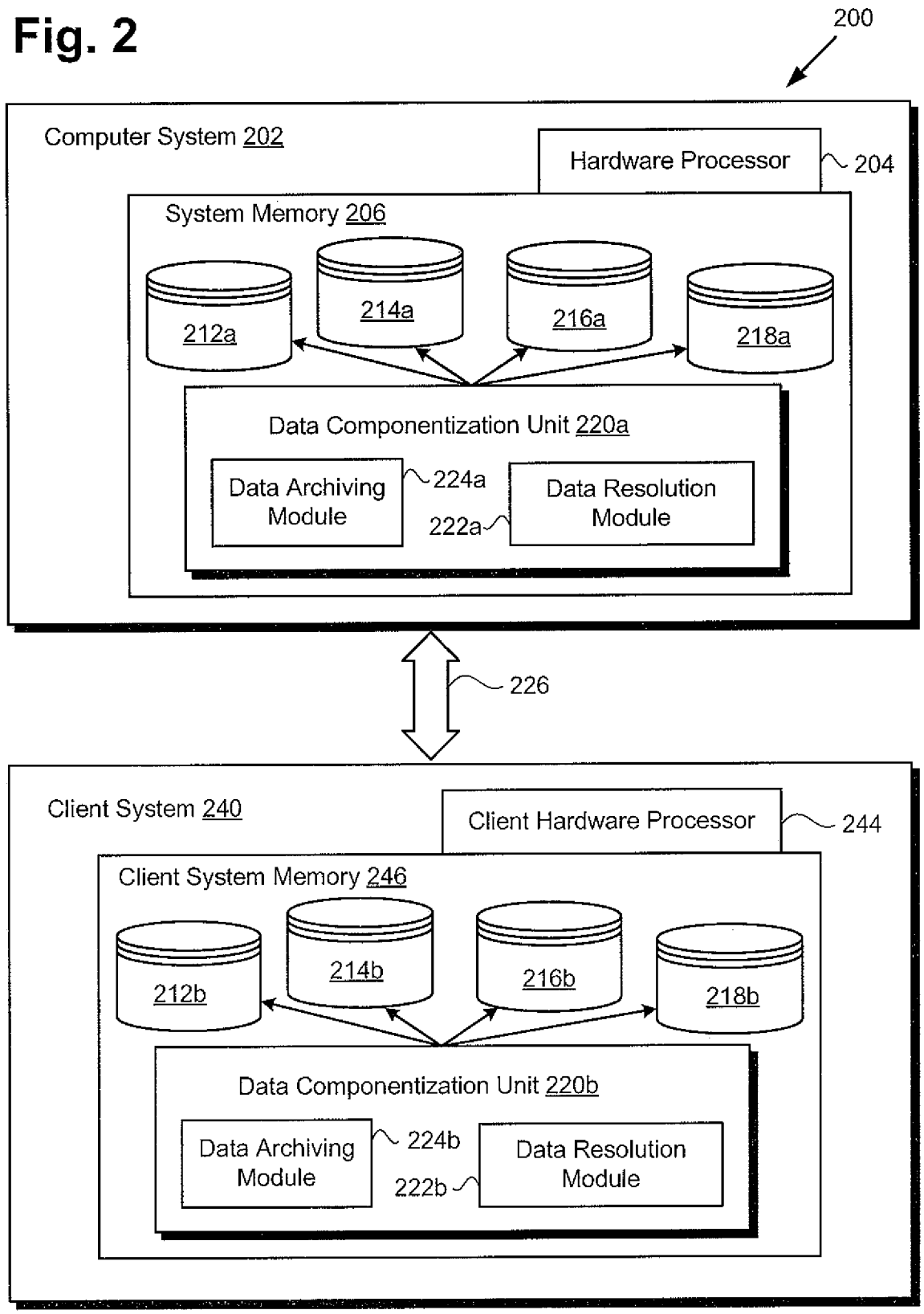
FIG. 2 shows another exemplary implementation of a computer system for performing componentized data storage.

Referring to FIG. 2, FIG. 2 shows a more detailed exemplary implementation of client system 240, which may itself be configured to perform componentized data storage. Computing environment 200 in FIG. 2 includes client system 240 interactively connected to computer system 202 over network communication link 226. As shown in FIG. 2, computer system 202 includes hardware processor 204, and system memory 206 storing data componentization unit 220*a* including data resolution module 222*a* and data archiving module 224*a*, as well as databases 212*a*, 214*a*, 216*a*, and 218*a*. As further shown in FIG. 2, client system 240 includes client hardware processor 244, and client system memory 246 storing data componentization unit 220*b* including data resolution module 222*b* and data archiving module 224*b*, as well as databases 212*b*, 214*b*, 216*b*, and 218*b*.

Network communication link 226, and computer system 202 including hardware processor 204 and system memory 206 correspond in general to network communication links 126, and computer system 102 including hardware processor 104 and system memory 106, in FIG. 1. In addition, data componentization unit 220*a* including data resolution module 222*a* and data archiving module 224*a*, in FIG. 2, corresponds to data componentization unit 120 including data resolution module 122 and data archiving module 124, in FIG. 1. In other words, data componentization unit 220*a*, data resolution module 222*a*, and data archiving module 224*a* may share any of the characteristics attributed to corresponding data componentization unit 120, data resolution module 122, and data archiving module 124 in the present application. Moreover, databases 212*a*, 214*a*, 216*a*, and 218*a* correspond respectively in general to databases 112, 114, 116, and 118, in FIG. 1, and may share any of the characteristics attributed to those corresponding features in the present application.

Client system 240 corresponds in general to client system 140, in FIG. 1. Moreover, data componentization unit 220*b* including data resolution module 222*b* and data archiving module 224*b* corresponds to data componentization unit 120/220*a* including data resolution module 122/222*a* and data archiving module 124/224*a*. As a result, data componentization unit 220*b*, data resolution module 222*b*, and data archiving module 224*b* may share any of the characteristics attributed to corresponding data componentization unit 120/220*a*, data resolution module 122/222*a*, and data archiving module 124/224*a* in the present application. In addition, databases 212*b*, 214*b*, 216*b*, and 218*b* correspond respectively in general to databases 112/212*a*, 114/214*a*, 116/216*a*, and 118/218*a* and may share any of the characteristics attributed to those corresponding features in the present application.

According to the exemplary implementation shown in FIG. 2, data componentization unit 220*b* including data resolution module 222*b* and data archiving module 224*b*, as well as databases 212*b*, 214*b*, 216*b*, and 218*b* are located in client system memory 246, having been received from computer system 202 via network communication link 226. In one implementation, network communication link 226 corresponds to transfer of data componentization unit 220*b* and databases 212*b*, 214*b*, 216*b*, and 218*b* over a packet network, for example. Once transferred, for instance by being downloaded over network communication link 226, data componentization unit 220*b* and databases 212*b*, 214*b*, 216*b*, and 218*b* may be persistently stored in client system memory 246 and may be executed locally on client system 240 by client hardware processor 244.

Client hardware processor 244 may be the central processing unit (CPU) for client system 240, for example, in which role client hardware processor 244 runs the operating system for client system 240 and executes data componentization unit 220*b*. In the exemplary implementation of FIG. 2, a user of client system 240, such as system user 160, in FIG. 1, can utilize data componentization unit 210*b* on client system 240 to generate componentized data for selective storage on one or more of databases 212*b*, 214*b*, 216*b*, and 218*b*.

Figure 3:
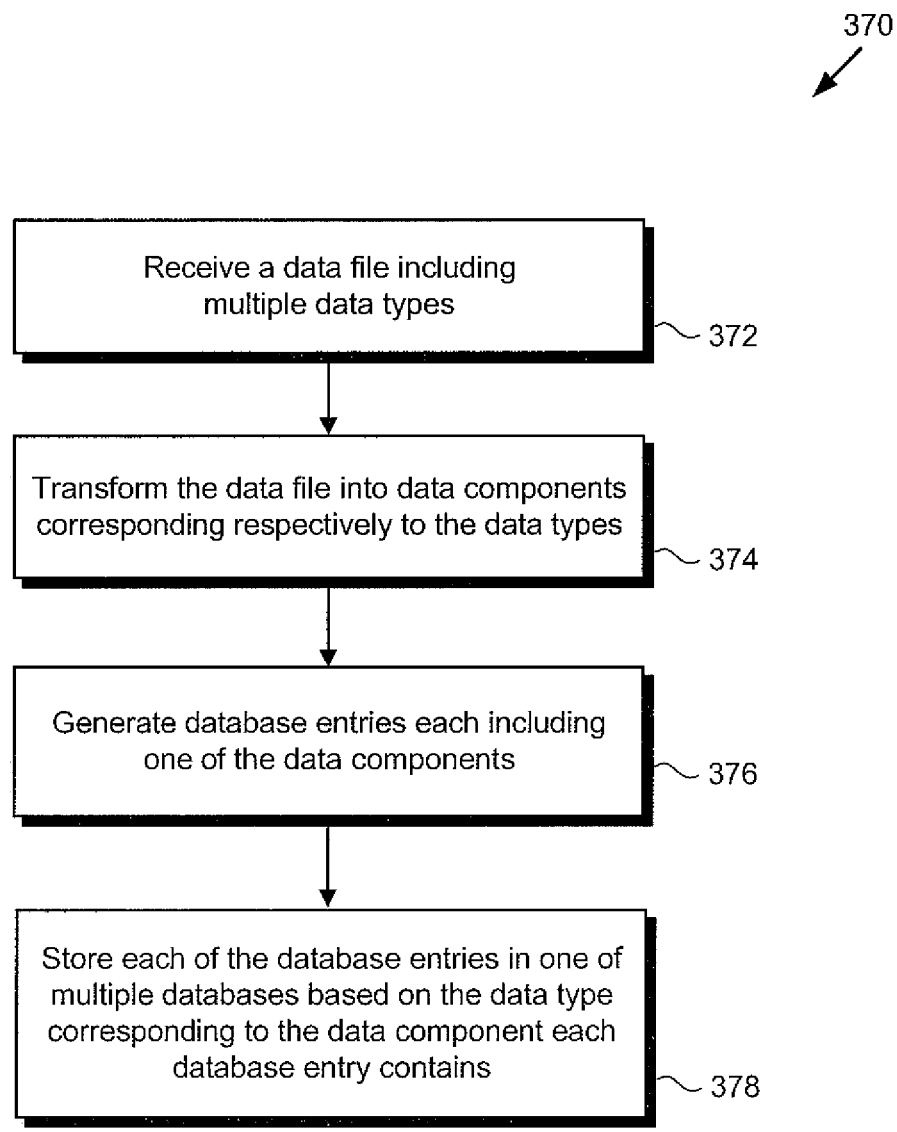
FIG. 3 is a flowchart presenting an exemplary method for use by a computer system for performing componentized data storage.
Figure 4:
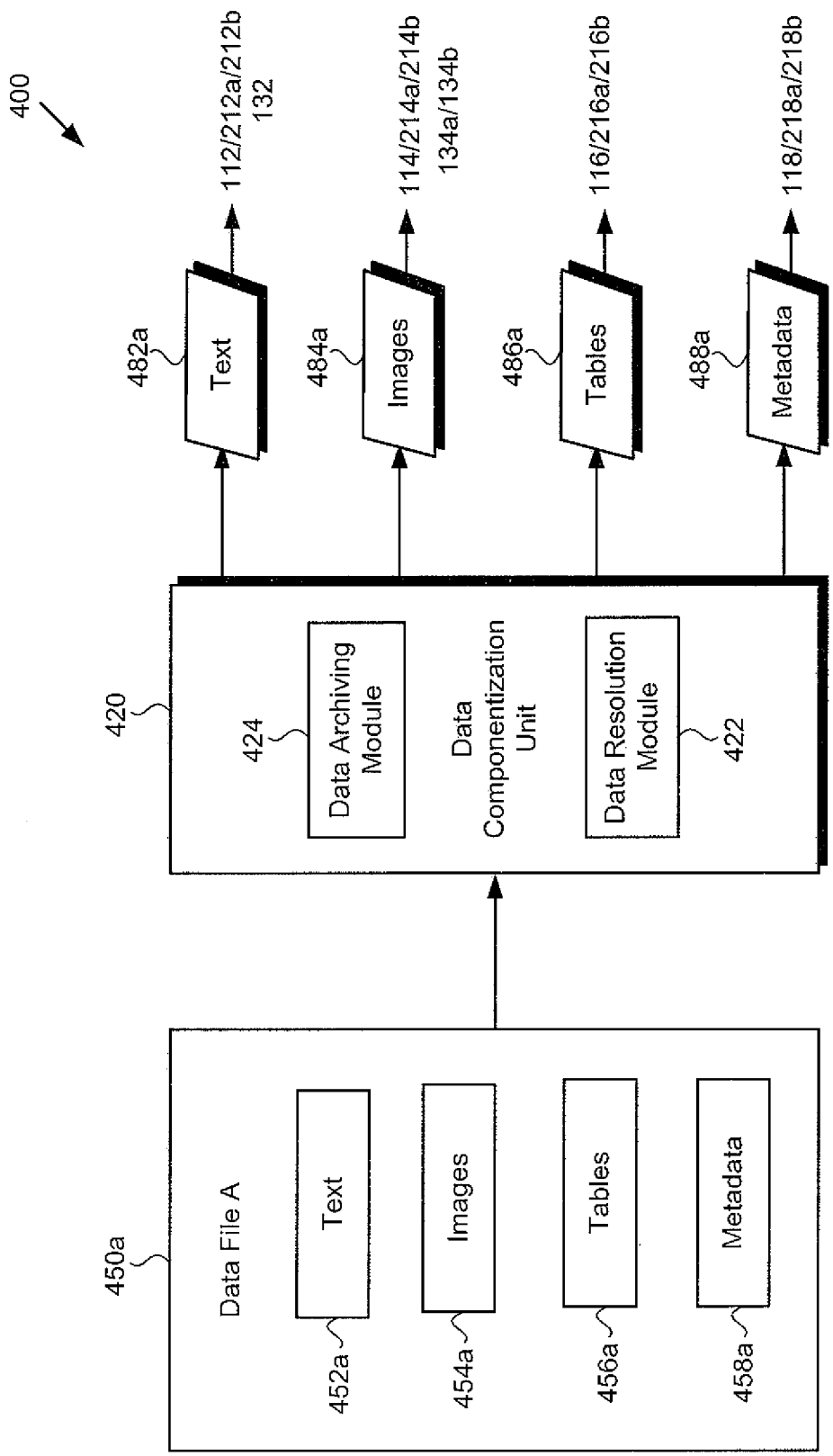
FIG. 4 shows a more detailed example of the operation of a data componentization unit suitable for use in the computer systems of FIG. 1 and FIG. 2, according to one exemplary implementation.
Figure 5:
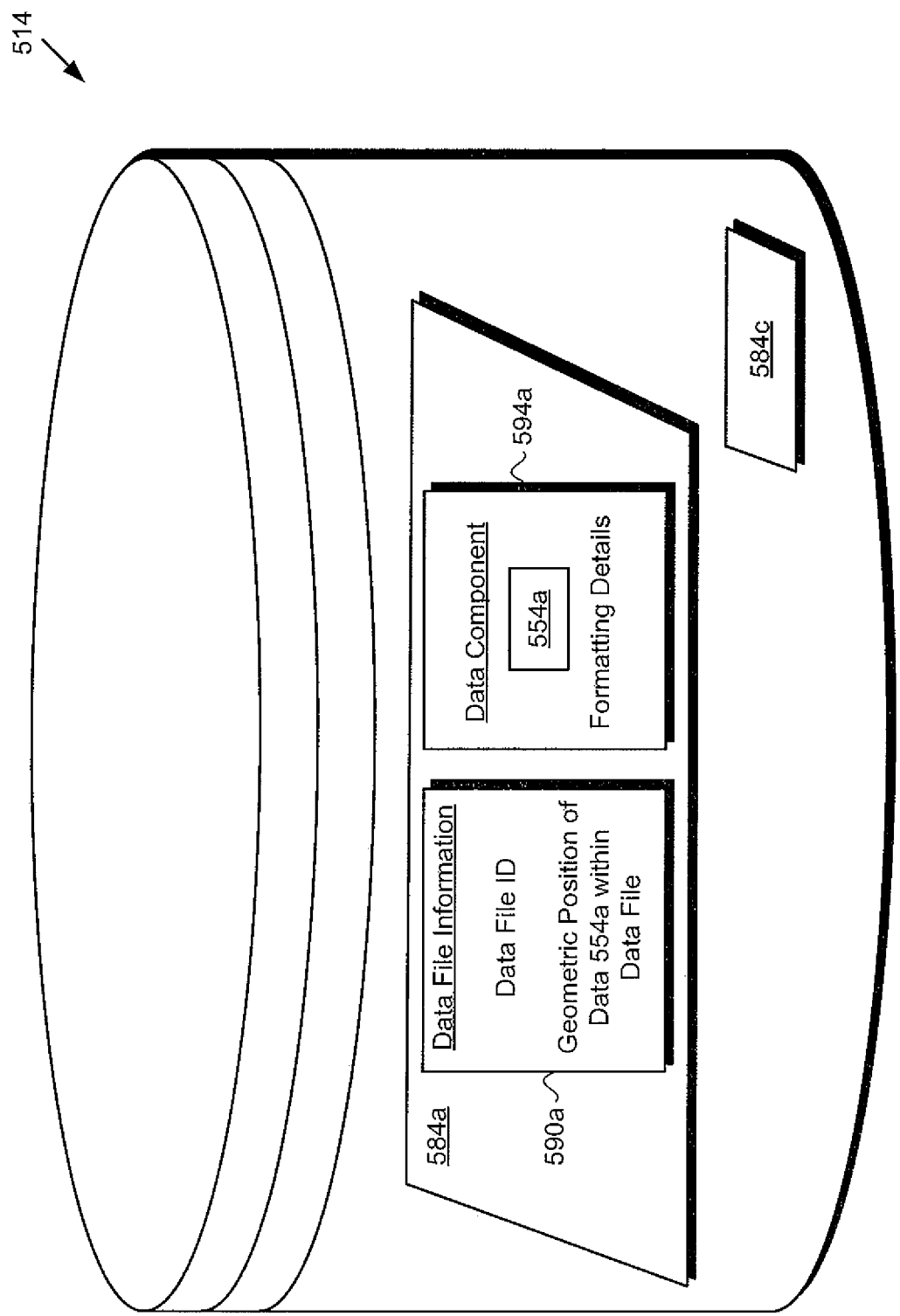
FIG. 5 shows an exemplary database and database entry included in a computer system for performing componentized data storage, according to one implementation.

FIGS. 1 and 2 will now be further described by reference to FIG. 3, FIG. 4, and FIG. 5. FIG. 3 presents flowchart 370 describing an exemplary method for use by a computer system for performing componentized data storage. FIG. 4 shows a more detailed example of the operation of a data componentization unit corresponding to data componentization unit 120/220*a*/220*b*, in FIG. 1/2. FIG. 5 shows an exemplary database and database entry utilized for componentized data storage, according to one implementation. With respect to the method outlined in FIG. 3, it is noted that certain details and features have been left out of flowchart 370 in order not to obscure the discussion of the inventive features in the present application.

Referring to FIG. 3 in combination with FIGS. 1 and 2, flowchart 370 begins with receiving a data file including multiple data types (action 372). Hardware processor 104/204/244 of system 102/202/240 may be configured to execute data componentization unit 120/220*a*/220*b* to receive any of data files 150*a*, 150*b*, 150*c*, for example.

Diagram 400, in FIG. 4, shows data componentization unit 420 including data resolution module 422 and data archiving module 424, and receiving data file 450*a* including data types 452*a*, 454*a*, 456*a*, and 458*a*. Data componentization unit 420 corresponds in general to data componentization unit 120/220*a*/220*b* in FIG. 1/2, and may share any of the characteristics attributed to that corresponding feature in the present application. Moreover, data file 450*a* and data types 452*a*, 454*a*, 456*a*, and 458*a* correspond respectively in general to data file 150*a* and data types 152*a*, 154*a*, 156*a*, and 158*a*, and may share any of the characteristics attributed to those corresponding features in the present application. Also shown in FIG. 4 are database entries 482*a*, 484*a*, 486*a*, 488*a* generated by data componentization unit 120/220*a*/220*b*/420, and which are further described below.

As shown in FIG. 4, data file 450*a* may include data types 452*a*, 454*a*, 456*a*, and 458*a* in the form of text data 452*a*, images data 454*a*, tables data 456*a*, and metadata 458*a*. According to one implementation, for example, hardware processor 104/204/244 may execute data componentization unit 120/220*a*/220*b*/420 to receive data file 150*a*/450*a* including text data 152*a*/452*a*, images data 154*a*/454*a*, tables data 156*a*/456*a*, and metadata 158*a*/458*a*. In addition, hardware processor 104/204/244 may be further configured to execute data componentization unit 120/220*a*/220*b*/420 to parse data file 150*a*/450*a* and to identify the different data types stored as text data 152*a*/452*a*, images data 154*a*/454*a*, tables data 156*a*/456*a*, and metadata 158*a*/458*a*.

Flowchart 370 continues with transforming data file 150*a*/450*a* into data components corresponding respectively to data types 152*a*/452*a*, 154*a*/454*a*, 156*a*/456*a*, and 158*a*/458*a* (action 374). Hardware processor 104/204/244 may be configured to execute data componentization unit 120/220*a*/220*b*/420 to transform data file 150*a*/450*a* containing data types 152*a*/452*a*, 154*a*/454*a*, 156*a*/456*a*, and 158*a*/458*a* into data components corresponding respectively to each data type. For example, data componentization unit 120/220*a*/220*b*/420, when executed by hardware processor 104/204/244, can utilize data resolution module 422 to transform data file 150*a*/450*a* into four data components. Those four data components would include a first data component corresponding to text data 152a/452a, a second data component corresponding to images data 154a/254a, a third data component corresponding to tables data 156a/456a, and a fourth data component corresponding to metadata 158a/458a.

Flowchart 370 continues with generating database entries 482a, 484a, 486a, and 488a each including one of the data components (action 376). Hardware processor 104/204/244 may be configured to execute data componentization unit 120/220a/220b/420 to generate database entries 482a, 484a, 486a, and 488a each including one of the data components corresponding respectively to data types 152a/452a, 154a/454a, 156a/456a, and 158a/458a. For example, data componentization unit 120/220a/220b/420, when executed by hardware processor 104/204/244, can utilize data archiving module 424 to generate database entries 482a, 484a, 486a, and 488a.

As shown in FIG. 4, according to the present specific example, four database entries are generated. Those four database entries are text database entry 482a including the first data component corresponding to text data 152a/452a, images database entry 484a including the second data component corresponding to images data 154a/454a, tables database entry 486a including the third data component corresponding to tables data 156a/456a, and metadata database entry 488a including the fourth data component corresponding to metadata 158a/458a.

Flowchart 370 can conclude with storing each of database entries 482a, 484a, 486a, and 488a in one of databases 112/212a/212b, 114/214a/214b, 116/216a/216b, or 118/218a/218b based on the data type corresponding to the data component each database entry contains (action 378). Hardware processor 104/204/244 may be configured to execute data componentization unit 120/220a/220b/420 to store each of database entries 482a, 484a, 486a, and 488a. For example, and as shown in FIG. 4, text database entry 482a is directed to database 112/212a/212b for storage, while each of images database entry 484a, tables database entry 486a, and metadata database entry 488a are directed to different databases based on the data type corresponding to the data component each database entry contains.

Alternatively, or in addition, hardware processor 104/204/244 may be configured to execute data componentization unit 120/220a/220b/420 to perform differential backup of data stored in any or all of databases 112/212a/212b, 114/214a/214b, 116/216a/216b, and 118/218a/218b. For example, referring to FIG. 4 in combination with FIG. 1, text database entry 482a may be directed to backup text database 132, which is depicted as an external database, remote from system 102/202/240, but accessible via communication network 130. Moreover, in some implementations, it may be advantageous or desirable to replicate the differential backups on multiple remote backup databases. For example, images database entry 484a may be directed to each of backup images databases 134a and 134b.

It is noted that in addition to enabling differential and distributed backup of data, based on data type, the present inventive principles can also be utilized to provide location based storage, based on data type. Thus, search requests for text data may be directed exclusively to backup text database 132, while search requests for images data may be directed to either of backup images databases 134a or 134b. It is further noted that although FIG. 1 and FIG. 4 explicitly depict differential backup of text data and images data, in other implementations, differential backup and remote storage of data may be performed analogously for tables database entry 486a and metadata database entry 488a. As a result, during periods of intensive searching or heavy post-processing of data corresponding to database entries 482a, 482b, 482c, and 482d, communications traffic can be advantageously distributed across the resources of communication network 130.

Referring to FIG. 5, FIG. 5 shows exemplary database 514 having database entries 584a and 584c stored therein. Database 514 corresponds in general to database 114/214a/214b in FIGS. 1/2, and may share any of the characteristics attributed to that corresponding feature in the present application. In addition, database entry 584a corresponds in general to images database entry 484a, in FIG. 4, and may share any of the characteristics attributed to that corresponding feature in the present application.

It is noted that, according to the present exemplary implementation, database 514 is an images database for storing database entries that include respective data components corresponding to images data 154a/454a and 154c. It is further noted that database entry 584c, which is shown in less detail than database entry 584a, may be generated by data componentization unit 120/220a/220b/420 according to the method outlined in flowchart 370 upon receipt of data file 150c, and may include features analogous to those shown and described by reference to database entry 584a. Moreover, database entries 482a, 486a, and 488a, in FIG. 4, also correspond in general to database entry 584a, and may include features analogous to those shown and described by reference to database entry 584a, while differing substantially only based on the data type to which their respective data components correspond.

As shown in FIG. 5, database entry 584a includes data file information 590a and data component 594a. According to the present exemplary implementation, data component 594a is one of the data components into which data file 150a/450a is transformed by data componentization unit 120/220a/220b/420, using data resolution module 122/222a/222b/422, in action 374 of flowchart 370. Thus, data component 594a includes data 554a (hereinafter "images data 554a") corresponding to images data 154a/454a of data file 150a/450a. In addition to images data 554a, and as also shown in FIG. 5, data component 594a may include formatting details, such as formatting instructions, for images data 554a.

Data file information 590a accompanies data component 594a in database entry 584a, and serves to identify data file 150a/450a from which images data 154a/454a/554a originates. Moreover, in some implementations, data file information 590a may also include additional information, such as the geometric position of images data 154a/454a/554a within data file 150a/450a.

Although not included in flowchart 370, in some implementations, the present method for performing componentized data storage may further include performing post-processing of database entry 584a to produce additional one or more post-processed database entries. For example, images data 154a/454a/554a may include descriptive text embedded with its images. Post-processing of database entry 584a may include extracting the descriptive text from the images in images data 154a/454a/554a and generating database entries for storing the post-processed data components in different databases based on the data type they contain. As a result, the post-processed images of images data 154a/454a/554a may be stored in database 114/214a/214b/514, while the descriptive text data extracted from images data 154a/454a/554a during post-processing of data component 594a may be stored in database 112/212a/212b.

As another specific example of post-processing, in some implementations, post-processing of a database entry including text data may include performing optical character recognition (OCR) on the text data. Alternatively, or in addition, post-processing of text data may include an aggregation on the text data, enabling recognition of an alphanumeric text entry in multiple formats. For example, the numerical expression "16" appearing in text data could be aggregated with alternative expression for the same number, such as the numerical expressions "12+4", "2×8", and the like. In those implementations, a search through text data for the numerical expression "16" would return text databases entries containing any expression of the same number.

Thus, the present application describes systems and methods for performing componentized data storage. According to implementations of the present inventive concepts, a data file including multiple data types is transformed into data components corresponding respectively to the multiple data types. Those data components, in turn, are used to generate database entries that are saved in databases segregated by data type, where the database entries can be searched, accessed, and modified. Consequently, the componentized data storage solution disclosed in the present application can increase the efficiency and effectiveness with which large-scale content searching, post-processing, and indexing of data is performed.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computer system for data storage and efficient content searching, the computer system comprising:
   a hardware processor and a system memory;
   a data componentization unit including a data resolution module and a data archiving module stored in the system memory;
   wherein the hardware processor is configured to execute the data componentization unit to:
   receive a plurality of data files each including a plurality of data types;
   transform each of the plurality of data files into data components corresponding respectively to the plurality of data types;
   generate a plurality of database entries each including one of the data components corresponding respectively to the plurality of data types;
   store each of the plurality of database entries in one of a plurality of databases segregated by and based on the plurality of data types corresponding respectively to the data components included in the plurality of database entries;
   receive a search request to search for a data within the plurality of data files;
   determine a data type of the data in the search request; and
   in response to the search request, exclusively search the one of the plurality of databases storing the data type corresponding to the determined data type of the data in the search request.

2. The computer system of claim 1, wherein the plurality of database entries each identifies one of the plurality of data files.

3. The computer system of claim 2, wherein the plurality of database entries each identifies a geometric position of the data type corresponding to the included one of the data components, in the one of the plurality of data files.

4. The computer system of claim 1, wherein the plurality of database entries each includes formatting instructions for the data type corresponding to the included one of the data components.

5. The computer system of claim 1, wherein one of the plurality of data types comprises text data.

6. The computer system of claim 1, wherein one of the plurality of data types comprises images data.

7. The computer system of claim 1, wherein one of the plurality of data types comprises tables data.

8. The computer system of claim 1, wherein one of the plurality of data types comprises metadata.

9. The computer system of claim 1, wherein the hardware processor is further configured to perform post-processing of at least one of the plurality of database entries to produce at least one post-processed database entry.

10. The computer system of claim 9, wherein the hardware processor is configured to perform post-processing of the at least one of the plurality of database entries by performing optical character recognition (OCR).

11. A method for use by a computer system having a hardware processor for data storage and efficient content searching, the method comprising:
    receiving, using the hardware processor, a plurality of data files each including a plurality of data types;
    transforming, using the hardware processor, each of the plurality of data files into data components corresponding respectively to the plurality of data types;
    generating, using the hardware processor, a plurality of database entries each including one of the data components corresponding respectively to the plurality of data types;
    storing, using the hardware processor, each of the plurality of database entries in one of a plurality of databases segregated by and based on the plurality of data types corresponding respectively to the data components included in the plurality of database entries;
    receiving, using the hardware processor, a search request to search for a data within the plurality of data files;
    determining, using the hardware processor, a data type of the data in the search request; and
    in response to the search request, exclusively searching, using the hardware processor, the one of the plurality of databases storing the data type corresponding to the determined data type of the data in the search request.

12. The method of claim 11, wherein the plurality of database entries each identifies one of the plurality of data files.

13. The method of claim 12, wherein the plurality of database entries each identifies a geometric position of the data type corresponding to the included one of the data components, in one of the plurality of data files.

14. The method of claim 11, wherein the plurality of database entries each includes formatting instructions for the data type corresponding to the included one of the data components.

15. The method of claim 11, wherein one of the plurality of data types comprises text.

16. The method of claim 11, wherein one of the plurality of data types comprises images.

17. The method of claim 11, wherein one of the plurality of data types comprises tables.

18. The method of claim 11, wherein one of the plurality of data types comprises metadata.

19. The method of claim 11, further comprising performing post-processing of at least one of the plurality of database entries to produce at least one post-processed database entry.

20. The method of claim 19, further comprising performing post-processing of the at least one of the plurality of database entries by performing optical character recognition (OCR).

\* \* \* \* \*